US012520263B2

United States Patent
Goyal et al.

(10) Patent No.: US 12,520,263 B2
(45) Date of Patent: Jan. 6, 2026

(54) MULTI TIMING ADVANCE ACQUISITION FOR A CANDIDATE CELL IN L1/2-TRIGGERED MOBILITY

(71) Applicant: Nokia Technologies Oy, Espoo (FI)

(72) Inventors: Sanjay Goyal, Denville, NJ (US); Timo Koskela, Oulu (FI); Keeth Saliya Jayasinghe Laddu, Espoo (FI); Ali Karimidehkordi, Munich (DE); Ahmad Awada, Munich (DE); Halit Murat Guersu, Munich (DE); Panagiotis Spapis, Munich (DE); Umur Karabulut, Munich (DE)

(73) Assignee: Nokia Technologies Oy, Espoo (FI)

( * ) Notice: Subject to any disclaimer, the term of this patent is extended or adjusted under 35 U.S.C. 154(b) by 567 days.

(21) Appl. No.: 18/170,816

(22) Filed: Feb. 17, 2023

(65) Prior Publication Data

US 2024/0284373 A1 Aug. 22, 2024

(51) Int. Cl.
*H04W 56/00* (2009.01)
*H04W 72/23* (2023.01)

(52) U.S. Cl.
CPC ..... *H04W 56/005* (2013.01); *H04W 56/0015* (2013.01); *H04W 72/23* (2023.01)

(58) Field of Classification Search
None
See application file for complete search history.

(56) References Cited

U.S. PATENT DOCUMENTS

2014/0105152 A1\* 4/2014 Wu .................. H04L 5/001
370/329
2015/0245403 A1\* 8/2015 Futaki ................. H04W 72/23
370/329

(Continued)

FOREIGN PATENT DOCUMENTS

CN 116017490 A \* 4/2023 ............ H04W 72/12
CN 115296781 B \* 4/2025 .......... H04W 74/006

(Continued)

OTHER PUBLICATIONS

3rd Generation Partnership Project; Technical Specification Group Radio Access Network; NR; Physical layer procedures for control (Release 17), 258 pages, 3GPP TS.38.213 v17.4.0.

(Continued)

*Primary Examiner* — Andrew C Oh
(74) *Attorney, Agent, or Firm* — Duft & Bornsen, PC

(57) ABSTRACT

In some embodiments, there may be provided a method that includes receiving timing advance acquisition parameters associated with multiple transmit receive points at a target distributed unit, wherein the timing advance acquisition parameters comprise, for the multiple transmit receive points, synchronization signal block indices, random access preamble indices, and physical random access channel mask indices; sending downlink control information to a user equipment, the downlink control information comprising an identifier of the target distributed unit, codepoints for the synchronization signal block indices, the random access preamble indices, and the physical random access channel (Continued)

mask indices; receiving timing advance estimates from the target distributed unit, wherein the timing advance estimates comprise estimates of timing advances associated with multiple transmit receive points at the target distributed unit; and sending the timing advance estimates associated with the multiple transmit receive points at the target distributed unit, to the user equipment.

19 Claims, 9 Drawing Sheets

(56) References Cited

U.S. PATENT DOCUMENTS

| | | | | |
|---|---|---|---|---|
| 2018/0110082 | A1* | 4/2018 | Saily | H04W 76/25 |
| 2020/0029292 | A1 | 1/2020 | Zou et al. | |
| 2020/0120553 | A1* | 4/2020 | Wang | H04W 76/34 |
| 2021/0160922 | A1* | 5/2021 | Luo | H04L 5/0053 |
| 2021/0321464 | A1* | 10/2021 | Lin | H04B 7/1851 |
| 2022/0132518 | A1* | 4/2022 | Lee | H04W 68/005 |
| 2022/0150858 | A1* | 5/2022 | Ren | H04L 27/2607 |
| 2022/0167297 | A1* | 5/2022 | Wang | H04W 56/00 |
| 2022/0210825 | A1* | 6/2022 | Zhu | H04W 74/0833 |
| 2022/0394737 | A1* | 12/2022 | Liu | H04B 7/15542 |
| 2023/0156508 | A1* | 5/2023 | Dong | H04W 24/08 370/252 |
| 2023/0421340 | A1* | 12/2023 | Tidestav | H04W 72/04 |
| 2024/0340065 | A1* | 10/2024 | Rune | H04W 74/0833 |
| 2025/0056454 | A1* | 2/2025 | Shi | H04W 56/0045 |

FOREIGN PATENT DOCUMENTS

| | | | | |
|---|---|---|---|---|
| WO | WO-2018231035 A1 * | 12/2018 | | H04W 76/32 |
| WO | WO-2022153953 A1 * | 7/2022 | | H04W 28/0236 |
| WO | WO-2023014263 A1 * | 2/2023 | | H04W 74/0833 |
| WO | WO-2023126782 A1 * | 7/2023 | | H04W 24/10 |
| WO | WO-2023206586 A1 * | 11/2023 | | H04B 7/06952 |
| WO | WO-2024086383 A1 * | 4/2024 | | H04W 92/04 |

OTHER PUBLICATIONS

3rd Generation Partnership Project; Technical Specification Group Radio Access Network; NR; Physical layer procedures for data (Release 17), 230 pages. 3GPP TS.38.214 v17.4.0.

3rd Generation Partnership Project; Technical Specification Group Radio Access Network; NR; NR and NG-RAN Overall Description; Stage 2 (Release 17), 210 pages, 3GPP TS 38.300 v17.3.0.

3rd Generation Partnership Project; Technical Specification Group Radio Access Network; NR; Medium Access Control (MAC) protocol specification (Release 16), 159 pages, 3GPP TS 38.321 v16.11.0.

3rd Generation Partnership Project; Technical Specification Group Radio Access Network; NR; Radio Resource Control (RCC) protocol specification (Release 15), 531 pages, 3GPP TS.38.331 v15. 20.1.

3rd Generation Partnership Project; Technical Specification Group Radio Access Network; NG-RAN; F1 application protocol (F1AP) (Release 16), 342 pages, 3GPP TS 38.473 v16.12.0.

Futurewei, "Comparison of TA acquisition schemes for L1/L2 Mobility," 3rd Generation Partnership Project (3GPP) TSG RAN WG1 Meeting #111, R1-2210853, Toulose, France, Nov. 14-18, 2022, 9 pages.

Lenovo, "Details of Early TA work," 3rd Generation Partnership Project (3GPP) TSG-RAN2#121, R2-2300221, Athens, Greece, Feb.-Mar. 2023, 10 pages.

European Search Report Issued in EP 24157417.7, mailed Jul. 19, 2024, in co-pending European Application, 19 pages.

* cited by examiner

MULTI TIMING ADVANCE ACQUISITION FOR A CANDIDATE CELL IN L1/2-TRIGGERED MOBILITY

FIELD

The subject matter described herein relates to wireless mobility.

BACKGROUND

In 3GPP, LTM refers to layer 1 (L1)/layer 2 (L2) triggered mobility (which is also referred to as L1/L2 inter-cell mobility). LTM represents mobility enhancements that provides, among other things, a decision about a cell change based on at least L1 measurements (e.g., physical layer measurements), and this decision is made, according to the 3GGP, in the medium access control (MAC) (e.g., layer 2) portion of a gNB-DU. In 5G (also referred to as new radio (NR) for example), the base station (e.g., the next generation Node B, gNB) may be a split or distributed base station that includes a gNB central unit (CU) and one or more gNB distributed units (DUs), which may serve one or more cells. For example, a DU may include one or more transmission reception points (TRPs) to serve one or more corresponding cells. The gNB CU may include non-time-critical functionalities (which could be hosted locally or on the cloud). The gNB-DUs include real-time functionalities such as radio link control (RLC), medium access control (MAC), and physical (PHY) layer functions. The F1 interface provides control (F1-C) and user (F1-U) plane connectivity between the CU and DUs. The F1 interface also provides separation between the radio network and transport network layers, while enabling the exchange of UE and non-UE associated information.

SUMMARY

In some embodiments, there may be provided a method that includes receiving, by a source distributed unit, timing advance acquisition parameters associated with multiple transmit receive points at a target distributed unit, wherein the timing advance acquisition parameters comprise, for the multiple transmit receive points, synchronization signal block indices, random access preamble indices, and physical random access channel mask indices: sending, by the source distributed unit, downlink control information to a user equipment, the downlink control information comprising an identifier of the target distributed unit, codepoints for the synchronization signal block indices, the random access preamble indices, and the physical random access channel mask indices: receiving, by the source distributed unit, timing advance estimates from the target distributed unit, wherein the timing advance estimates comprise estimates of timing advances associated with multiple transmit receive points at the target distributed unit; and sending, by the source distributed unit, the timing advance estimates associated with the multiple transmit receive points at the target distributed unit, to the user equipment.

In some variations, one or more of the features disclosed herein including the following features can optionally be included in any feasible combination. The codepoint for the synchronization signal block indices indicates a set of synchronization signal block indices associated with a set of transmit receive points at the target distributed unit, the codepoint for the random access preamble indices indicative of a set of random access (RA) preamble indices associated with the set of transmit receive points, and the codepoint for the physical random access channel mask indices indicates a set of physical random access channel mask indices associated with the set of transmit receive points, the codepoints being in accordance with a configuration provided to the user equipment as a part of the timing advance acquisition parameters. The source distributed unit sends, to the user equipment in the cell switch command, the timing advance estimates associated with the multiple transmit receive points at the target distributed unit. The timing advance estimates associated with the multiple transmit receive points comprise an indication of an absolute timing advance value for a transmit receive point and one or more indications of one or more differences of time advance values with respect to the absolute timing advance value, the one or more differences corresponding to the other transmit receive points. Each estimate of time advance is indicated with an associated CORESET Pool index. The method may further comprise receiving, by the source distributed unit, a random access channel configuration for accessing the multiple transmit receive points at the target distributed unit: selecting, by the source distributed unit, the timing advance acquisition parameters for the target distributed unit, the timing advance acquisition parameters comprising codepoints for the synchronization signal block indices, the random access preamble indices, and the physical random access channel mask indices; sharing, by the source distributed unit, the selected timing advance acquisition parameters with the target distributed unit; and/or in response to confirmation of the selected timing advance acquisition parameters by the target distributed unit, sending, by the source distributed unit, the selected timing advance acquisition parameters to the user equipment.

In some embodiments, there may be provided yet another method that includes in response to receiving a beam report for a target distributed unit operating with multiple transmit receive points, selecting, by the target distributed unit, timing advance acquisition parameters for the target distributed unit, wherein the timing advance acquisition parameters include synchronization signal block indices, random access preamble indices, and physical random access channel mask indices: sharing, by the target distributed unit, the selected timing advance acquisition parameters with a source distributed unit: in response to one or more physical random access channel preambles from a user equipment, estimating, by the target distributed unit, timing advances for the multiple transmit receive points at the target distributed unit; and sharing, by the target distributed unit, the estimated timing advances with the source distributed unit to enable a switch command including the estimated timing advances.

In some variations, one or more of the features disclosed herein including the following features can optionally be included in any feasible combination. The method may further comprise in response to receiving the beam report for the target distributed unit operating with multiple transmit receive points, selecting, by the target distributed unit, timing advance acquisition parameters for the target distributed unit, wherein the timing advance acquisition parameters include synchronization signal block indices, random access preamble indices, and physical random access channel mask indices, reference signal identifier or transmission configuration index state associated with a transmit receive point: sharing, by the target distributed unit, the selected timing advance acquisition parameters with a source distributed unit: in response to one or more physical random access channel preambles from a user equipment, estimating, by the target distributed unit, timing advances for the multiple transmit receive points at the target distributed unit; and/or sending, by the target distributed unit, the estimated timing advances associated with multiple transmit receive points to the user equipment, using the indicated transmit receive point.

In some embodiments, there may be provided yet another method that includes receiving, by a user equipment, timing acquisition parameters associated with multiple transmit receive points at a target distributed unit, wherein the timing advance acquisition parameters comprise, for the multiple transmit receive points, codepoints for one or more sets of synchronization signal block indices associated with a set of transmit receive points, codepoints for one or more sets of random access preamble indices associated with the set of transmit receive points, and codepoints for one or more sets physical random access channel mask indices associated with the set of transmit receive points: receiving, by the user equipment, downlink control information from a source distributed unit, the downlink control information comprising an identifier of a target distributed unit, codepoints for synchronization signal block indices, random access preamble indices, and a physical random access channel mask indices: in response to the downlink control information, determining, by the user equipment, first message parameters for random access of the multiple transmit receive points at the target distributed unit: performing, by the user equipment and using the determined first message parameters, preamble transmissions to the multiple transmit receive points at the target distributed unit to enable timing advance estimation; and receiving, by the user equipment, estimated timing advance for the multiple transmit receive points at the target distributed unit.

In some variations, one or more of the features disclosed herein including the following features can optionally be included in any feasible combination. The user equipment, using codepoints in the downlink control information, determines the first message parameters for access of the multiple transmit receive points by at least deriving the synchronization signal block indices, random access preamble indices, physical random access channel mask indices from the received timing acquisition parameters. The estimated timing advance associated with multiple transmit receive points at the target distributed unit are received in the cell switch command from the source distributed unit and/or from the target distributed unit. A reference signal identifier or transmission configuration index state identifier to be used to receive the timing advance associated with multiple transmit receive points from the target distributed unit are provided to the user equipment in the downlink control information from the source distributed unit. The method may further comprise determining that an order of indicators of the received timing advance parameters, which are associated with multiple transmit receive points, are in a same order of transmission of the first message of random access. The method may further comprise determining that indicators of the received timing advance values are associated with the multiple transmit receive points beam indications, wherein at least a first timing advance indicator is associated with the first beam indication, and a second timing advance indicator is associated with the second beam indication.

In some embodiments, there may be provided yet another method that includes receiving, by a control unit, a context setup for a user equipment, wherein the context setup comprises timing advance acquisition parameters associated with multiple transmit receive points at a target distributed unit, wherein the timing advance acquisition parameters comprise, for the multiple transmit receive points, synchronization signal block indices, random access preamble indices, and physical random access channel mask indices; generating, by the control unit, a radio resource control reconfiguration message comprising the timing advance acquisition parameters associated with multiple transmit receive points at the target distributed unit, wherein the timing advance acquisition parameters comprise, for the multiple transmit receive points, synchronization signal block indices, random access preamble indices, and physical random access channel mask indices: sending, by the control unit, the radio resource control reconfiguration message towards the user equipment: in response to receiving a beam report that is sent after a decision to switch to the target distribution unit, selecting the timing advance acquisition parameters for the target distributed unit, wherein the selected timing advance acquisition parameters comprise codepoints for the synchronization signal block indices, the random access preamble indices, and the physical random access channel mask indices: sharing, by the control unit, the selected timing advance acquisition parameters with the target distributed unit; and in response to confirmation of the selected timing advance acquisition parameters by the target distributed unit, sending, by the control unit, the selected timing advance acquisition parameters to the user equipment via a source distributed unit to enable a timing advance acquisition for the target distribution unit with multiple transmit and receive points operation.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
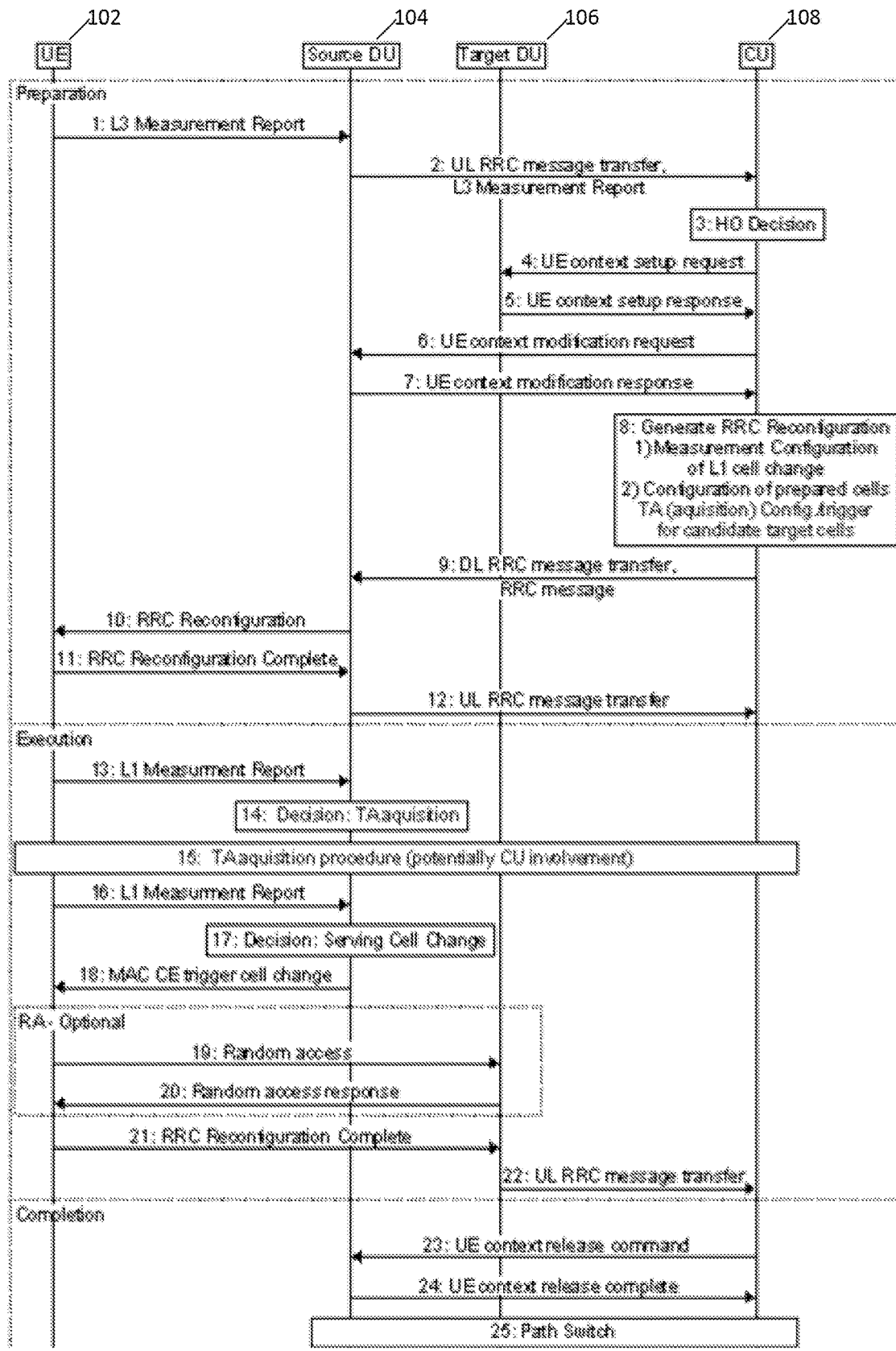
FIG. 1 shows an example of a message exchange for L1/L2 triggered mobility (LTM) among distributed units (DUs), in accordance with some embodiments.

Like labels are used to refer to same or similar items in the drawings.

DETAILED DESCRIPTION

FIG. 1 shows an example of a message exchange for L1/L2 triggered mobility (LTM) scenario among DUs (e.g., an inter-DU scenario). FIG. 1 includes a UE 102, a source DU 104, a target DU 106, and a CU 108. The source DU represents the DU before the mobility event, and the target (or candidate) DU represents the candidate cell or DU being considered for after the cell switch or handover associated with the mobility event.

At 1, the UE 102 provides layer 3 (L3) measurements to the source DU 104, and the L3 measurements are forwarded, at 2, to the CU 108. Based on the measurements, the CU makes a decision, at 3, about the cell preparation for a handover (HO) decision). At 4-5, the CU proceeds with setting up the UE context in the target DU 106. At 6-7, the CU communicates with the source DU for the modification of the UE context (if needed) and the provision of the target DU (or cell) information (i.e., target cell RS configuration, TCI states, etc.). At 8, the CU creates and then forwards, at 9, a radio resource control (RRC) reconfiguration message to the source DU 104 using a downlink (DL) RRC message transfer, such that the source DU forwards, at 10, the reconfiguration message to the UE. The messages at 9-11 may include a timing advance (TA) acquisition configurations, if CU involvement is needed. At 11-12, the UE responds with an RRC reconfiguration complete message to the CU.

Based on the UE's 102 configuration, the UE 102 may provide, at 13, periodic L1 measurement reports to the source DU 104. Based on the received L1 measurement report, the source DU 106 may trigger the UE (e.g., by sending a Physical Downlink Control Channel (PDCCH) order) to acquire a timing advance (TA) for a set of one or more candidate cells (e.g., candidate DUs to serve as a handover or cell switch target cell) as depicted at 14-15. Regarding the mechanism to acquire the TA of the candidate DUs (or cells), an additional RACH-based PDCCH order-based mechanism, an additional RACH-less solution like receiver (RX) timing difference, a RACH-less mechanism as in LTE, and/or an SRS based TA acquisition may be used as well. The source-DU or CU and a candidate target DUs (or CUs) may coordinate on the TA acquisition mechanism during LTM preparation phase, such as at 4-5. At 16, the UE may continue L1 measurement reporting. Once the source DU 104 decides that the UE should be handed over to a target cell (e.g., target DU 106), the source DU triggers, at 17, the cell switch, using at 18 a cell switch command (e.g., a MAC Control Element (CE)). The cell switch command depicted at 18 may also include the TA of the target DU or cell. At this point, the UE 102 applies the RRC configuration for the target DU as indicated by the cell switch command (e.g., MAC CE at 18), and the UE switches to the target DU. At 19-20, the UE may optionally be configured to perform Random Access (RA) to the target DU 106; however, the UE may be configured not to perform the RA to the target DU 106 as the UE may have already acquired the TA of the target DU 106. To initiate the communication with the target DU, the UE transmits, at 21, an RRC Reconfiguration Complete message to the target DU (using the already configured uplink (UL) resources), which is forwarded at 22 to the CU 108. Next, The CU releases, at 23, the UE context from the source DU 104 with a UE Context Release Request (which is acknowledged by the source DU at 24) and performs, at 25, a path switch to the target DU 106.

With respect to group based beam reporting and multiple transmit receive point (TRP) operation, for a single Downlink Control Information (DCI) based multi-Physical Downlink Shared Channel (PDSCH) transmissions, a Transmission Configuration Index (TCI) code point in a DCI can correspond to 2 TCI states (e.g., a maximum of 2 TRPs are currently supported in 3GPP). For a single DCI spatial domain multiplexing PDSCH scheme, when 2 TCI states are indicated by a TCI code point and the indicated Downlink Modulation Reference Signals ports are from two code division multiplexing groups, the first and second TCI states applied to the first and second indicated code division multiplexing groups, respectively. For single DCI frequency division multiplexing (FDM)/time division multiplexing (TDM) PDSCH schemes, when 2 TCI states are indicated by a TCI code point and corresponding FDM/TDM scheme is pre-configured, the first and second TCI states are applied to the first and second indicated frequency division/time division resource allocations, respectively. For a multi-DCI based multi PDSCH transmission, each DCI schedules a respective PDSCH in which each PDSCH is transmitted from a separate TRP. For multi-DCI based multi PDSCH transmission, if a UE is configured by higher layer parameter PDCCH-Configuration that contains two different values of coresetPoolIndex in ControlResourceSet, the UE may expect to receive multiple PDCCHs scheduling fully and/or partially and/or non-overlapped PDSCHs in time and frequency domain.

In order to enable multiple TRP (mTRP) operation, for periodic and semi-persistent channel state information (CSI) Resource Settings, when the UE is configured with groupBasedBeamReporting-r17, the number of CSI Resource Sets configured is S=2 for example, otherwise the number of Channel State Information Reference Signal (CSI-RS) Resource Sets configured is limited to S=1, for example. See, e.g., Section 5.2.1.2 from TS 38.214. If the UE is configured with a CSI-ReportConfig with the higher layer parameter reportQuantity set to cri-RSRP, ssb-Index-RSRP, cri-RSRP-Capability[Set]Index or ssb-Index-RSRP-Capability[Set]Index and if the UE is configured with the higher layer parameter groupBasedBeamReporting-r17, the UE is not required to update measurements for more than 64 CSI-RS and/or synchronization signal block (SSB) resources, and the UE reports in a single reporting instance nrofReportedRSgroup, if configured, group(s) of two CRIs (CSI-RS Resource Indicator) or SSBRIs (SS/PBCH Block Resource Indicator) by selecting one CSI-RS or SSB (Synchronization Signal Block) from each of the two CSI Resource Sets for the report setting, where CSI-RS and/or SSB resources of each group can be received simultaneously by the UE (see, e.g., Section 5.2.1.4.2 from TS 38.214).

With respect to the Physical Downlink Control Channel (PDCCH) Order details, the Layer 1 Downlink Control Indication (DCI) format 1_0 may be used to send a PDCCH order. The information of Table 1 below may (in whole or in part) be transmitted using the DCI format 1_0 with CRC scrambled by Cell-Radio Network Temporary Identifier (C-RNTI). See, e.g., Section 7.3.1.2.1, TS 38.212).

TABLE 1

- Identifier for DCI formats - 1 bit
    - The value of this bit field is always set to 1, indicating a DL DCI format TABLE 1-continued

- Frequency domain resource assignment - $\lceil \log_2(N_{RB}^{DL,BWP}(N_{RB}^{DL,BWP} +1)/2) \rceil$ bits where $N_{RB}^{DL,BWP}$ is the size of the size of CORESET 0 if CORESET 0 is configured for the cell; otherwise, it is the size of initial DL bandwidth part.
  - The value of this field is set to all ones
- Random Access Preamble index - 6 bits according to ra-PreambleIndex in Clause 5.1.2 of TS 38.321.
  - It indicates which Random-access preamble to use in case of Contention Free Random Access (CFRA) or the value 000000 in the case of Contention based Random Access (CBRA) procedure. If the Preamble index bit is set as '0' then the UE will trigger a contention-based random-access procedure or else if the Preamble index is >0, then UE will trigger a Contention-free Random-access procedure. Non-zero values are used to allocate the dedicated Prach index (0 to 63) to the UE.
- UL/SUL indicator - 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1 in TS 38.212; otherwise, this field is reserved
- SS/PBCH index - 6 bits. If the value of the "Random Access Preamble index" is not all zeros, this field indicates the SS/PBCH that shall be used to determine the RACH occasion for the PRACH transmission; otherwise, this field is reserved.
- PRACH Mask index - 4 bits. If the value of the "Random Access Preamble index" is not all zeros, this field indicates the RACH occasion associated with the SS/PBCH indicated by "SS/PBCH index" for the PRACH transmission, according to Clause 5.1.1 of TS 38.321; otherwise, this field is reserved
- Reserved bits - 12 bits for operation in a cell with shared spectrum channel access in frequency range 1 or when the DCI format is monitored in common search space for operation in a cell in frequency range 2-2; otherwise, 10 bits.

In 3GPP Rel-16, the intra-cell multi-TRP (mTRP) downlink shared channel transmission is enabled to improve reliability and robustness with both ideal and non-ideal backhaul with further enhancements in Rel-17 for other downlink (PDCCH) and uplink channels (e.g., Physical Uplink Control Channel (PUCCH) and the Physical Uplink Shared Channel (PUSCH)), as well as inter-cell scenarios. More recently with Rel-18, L1/L2 triggered mobility (LTM), in addition to reduced interruption time, a motivation is to maintain or even improve transmission efficiency and reliability in the process of fast cell switch. In order to reduce the handover interruption time, the UE may be configured to perform early uplink (UL) synchronization, such as TA acquisition for one or more candidate cells (including the target cell) before the cell switch command is received by the UE. This early TA acquisition eliminates the need of UL synchronization with the target cell upon cell switch and hence reduces the interruption time.

In some embodiments, there are provided processes that perform an early TA acquisition for a candidate (also referred to as "target") cell or DU, when the UE is configured with a multiple TRP (mTRP operation) after the cell change to the target cell (or DU). The use of the early TA acquisition reduces the delay for the target cell or DU to trigger an mTRP operation for the UE, which may also enhance the downlink and/or uplink throughput as well as enhance reliability. Prior to the disclosed subject matter, after the cell change (e.g., a move from a source DU to a target DU), the UE operates in a single TRP operation within the target DU and then later if the network decides to switch the UE in to an mTRP operation, a separate TA acquisition is triggered to acquire the UL synchronization with the additional selected TRP. This separate TA acquisition is not needed or eliminated using the embodiments disclosed herein. During the time of the separate TA acquisition after the switch, the UE is not be able to operate in an mTRP operation within the target cell. In some implementations, there may be provided an advantage of the UE being able to perform early UL synchronization with multiple TRPs within the target cell (or DU) in LTM which can reduce the handover interruption time and allows the UE to start operating in an mTRP setting immediately after the handover or cell switch to the target DUs operating in mTRP.

To provide the UE with early TA acquisition while enabling an mTRP operation within the target DU immediately after the cell switch to the target DU, the UE may be configured with a target DU configuration that includes Random Access Channel (RACH) related parameters. The "target DU" referred to herein also refers to the "target cell" unless expressly said otherwise. The Random Access Channel (RACH) related parameters refer to those parameters that may be needed to perform RA for the target DU while in mTRP operation. These parameters may include one or more of the following: prach-ConfigurationIndex, msg1-FDM, msg1-FrequencyStart, zeroCorrelationZoneConfig, totalNumberOfRA-Preambles, ssb-perRACH-OccasionAndCB-PreamblesPerSSB, prach-RootSequenceIndex, msg1-SubcarrierSpacing, RA transmit power control parameters, and/or the like (which are defined in for example 3GPP TS 38.331).

Moreover, the UE may be configured to measure and report one or more beam (L1) measurements for the target DU(s) at one or more times to the source DU. For example, the UE may be configured with mTRP beam measurement and reporting for the target DU. To illustrate further by way of an example, the UE may be configured with group-based beam reporting (e.g., Rel-17 groupBasedBeamReporting) for the target DU where the channel measurement resource configuration contains multiple (e.g., two in Rel-17) channel state information (CSI) resource sets, and the CSI report configuration enables the UE to report multiple reference symbol (or signal) (RS) groups in a single reporting instance. Each RS group in a report may include multiple (e.g., two in Rel-17) CRIs (CSI-RS Resource Indicator) or SSBRIs (SS/PBCH Block Resource Indicator) by selecting one CSI-RS or SSB from each of the CSI Resource Sets where CSI-RS and/or SSB resources of each group can be received simultaneously by the UE.

With respect to the determination of RACH parameters, based on the beam (e.g., Layer 1) measurement report(s) of the UE, the source DU (or target DU or CU) may select an mTRP configuration. Based on the selected mTRP configuration for example, a source DU (or a target DU or a CU) may select parameters (for early TA acquisition for the UE) and the selected parameters may be selected in accordance with one or more aspects listed in Table 2.

occasions are associated with the SS/PBCH block index indicated by the SS/PBCH block index field of the PDCCH order.

Alternatively, or additionally, for one or more parameters (e.g., SSB/CSI-RS indices, RA preamble indices, PRACH mask indices), first a list/set (wherein each tuple/entry has an identifier and contains a combination such as pair, three, four, etc. of the indices such as where each index is for a different TRP) may be configured. Referring to Table 3, it shows a list containing the different combinations of SSB indices (where the parenthesis show which TRP it is associated with, but this information may not be part of the list itself) for a configuration with up to 4 TRPs. Each SSB (which is within a SSBlock set) is assigned with a unique number starting from for example 0 and increasing by 1, and this number reset to 0 in the next SSB Set. This unique number is referred to as an SSBlock index can be is informed to UE. Some entries at Table 3 may only use a

TABLE 2

- SSB (or CSI-RS) indices that are associated with multiple TRPs (selected for mTRP operation) with at least one SSB (CSI-RS) index per TRP; when the group-based beam reporting is enabled, a group from the set of reported groups (which contains the ID and measurements of reference signals (RSs) from different TRPs) may be selected.
- For contention free random access (CFRA) based early TA acquisition, the RA preamble indices are associated with multiple TRPs (selected for mTRP operation) with at least one RA preamble index per TRP.
- A first SSB (or CSI-RS) index, first RA preamble index, first PRACH mask index which may be associated with a first TA value (to be acquired) and a second SSB (or CSI-RS) index, second RA preamble, second PRACH mask index (if present) which may be associated with a second TA value e.g TA1 and TA2 or TA loop1 or TA loop2, and so forth; the UE may be configured to apply same settings for the parameters which are configured with one value from the network.
- An association between a SSB index, RA preamble, or/and PRACH mask index (first/second/... /nth) and a timing advance group (TAG) may be given as: pre-configured to the UE via RRC (e.g., in a RACH configuration) or indicated to the UE via dynamic signaling (e.g., in a PDCCH order triggering the RA preamble transmissions, or MAC-CE).

The selected parameters SSB (or CSI-RS) indices, group index (which are selected from the UE's group-based beam reporting), RA preamble indices, or/and PRACH mask indices (which are associated with the mTRP configuration) may be used for providing a configuration that enables the UE to acquire the TA early when switching to the target DU operating with mTRP. Each SSB (which is within an SSBlock set) is assigned with a unique number starting from for example 0 and increasing by 1, and this number reset to 0 in the next SSB Set. The PRACH mask index is a configuration used for contention free RACH. For example, subset of TRPs (depending on which TRPs to be activated/configured). The list(s) may be given to the UE in the target cell configuration. To indicate the selected set of indices of a parameter (e.g., SSB indices), an identifier of the tuple containing the selected indices may be used for providing the configuration to the UE. This may be done for one or more parameters (e.g., SSB/CSI-RS indices, RA preamble indices, PRACH mask indices).

TABLE 3

| #  |             |              |              |              |
|----|-------------|--------------|--------------|--------------|
| #1 | SSB 2 (TRP1)| SSB 8 (TRP2) |              | SSB 25 (TRP 4)|
| #2 | SSB 4 (TRP1)|              | SSB 16 (TRP 3)|              |
| #3 | SSB 2 (TRP1)| SSB 11 (TRP2)| SSB 20 (TRP 3)| SSB 24 (TRP 4)|
| #4 |             | SSB 8 (TRP2) | SSB 18 (TRP 3)|              |
| #5 |             |              | SSB 21 (TRP 3)| SSB 27 (TRP 4)|
| .  |             |              |              |              |
| .  |             |              |              |              |
| .  |             |              |              |              | for a PRACH transmission triggered by a PDCCH order, the PRACH mask index field (if the value of the random access preamble index field is not zero) indicates the PRACH occasion for the PRACH transmission where the PRACH In some embodiments, the target DU may determine the noted TA acquisition related parameters for the UE. To enable the target DU to select an mTRP bandwidth part (BWP) configuration and then the TA acquisition related parameters, the source DU may share (e.g., forward) the relevant L1 measurement reports to the target DU (e.g., via CU and F1 interface and forwarding L3 measurement such as in a beam-based format). Next, the target DU may share the selected TA acquisition related parameters with the source DU (e.g., via CU and F1 interface). In some embodiments, the target DU may provide an indication that identifies a set of parameters (that has been already shared/broadcasted with source-DU or UE) to be used for TA acquisition.

In some embodiments, the source DU may determine the noted TA acquisition related parameters for the UE. To enable the source DU to select the appropriate mTRP configuration and the TA acquisition parameters, the target DU may share with the source DU the (1) configuration of the group-based beam reporting (e.g., the configuration of multiple CSI resource sets) or (2) mappings (or associations) between SSBs/CSI-RSs and TRPs, RACH related parameters (which may be needed to determine the above TA acquisition related parameters), list of combination of indices of TA acquisition related parameters (e.g., SSB/CSI-RS indices, RA preamble indices, and/or PRACH mask indices) if configured by the target cell. After determining the TA acquisition parameters, the source DU may share the parameters with the target DU (e.g., via CU). The target DU may send an acknowledge (ACK) to the source DU. For example, the target DU may also deny on the selected parameters and send a NACK with or without the target DU's preferred parameter selection: in which case, the source DU may select the parameters given by the target DU.

In some embodiments, the source DU may share the UE's beam report(s) with the CU and then based on the reports, the CU may select an appropriate mTRP configuration and the above TA acquisition related parameters for the UE. Moreover, the source DU may send that info (e.g., the selected TA acquisition parameters) to the source DU. Before sending the parameters to the source DU, the CU may share the parameters with the target DU. The target DU may send an ACK to the CU. For example, the target DU may also deny on the selected parameters and send a NACK to the CU with or without the target DU's preferred parameter selection: in which case, the CU may select the parameters given by the target DU.

In some embodiments, the source DU may send to the UE, one or more parameters for TA acquisition for mTRP in the target cell (or DU). To that end, the DCI may be used, wherein a new DCI may be defined (or the existing PDCCH order DCI (DCI format 1_0) may be extended/modified) or a medium access control (MAC) control element (CE) command may be used to send such parameters to the UE.

In some embodiments, in the downlink (DL) message (e.g., DCI or MAC-CE), a field indicating the number of TAs and/or TRPs being configured may be used. When this is the case, a list (e.g., a number of fields) of SSB (or CSI-RS) indices, a list (a number of fields) of RA preamble indices (in case of CFRA), and/or a list (a number of fields) of PRACH mask indices (in case of CFRA) may be used where the number of elements in each list or number of fields associated with each parameter may be equal to the number of TAs and/or TRPs. Moreover, there may be other parameters in the DCI message (target cell identifier, UL/DL indicator, etc.). The UE may also determine the number of TRPs and the associated parameters from the DL message.

Instead of a list of SSB (or CSI-RS) indices, a group index (selected from the UE's group-based beam reporting) may be indicated, in accordance with some embodiments. The UE may be configured to derive the SSB indices from the group index. For example, the UE may use a recent group-based beam report of the candidate target cell (this may be indicated as well from the source DU) and may assume the group indices are assigned in the sequence they reported, therefore may select the appropriate group based on the indicated group index. From the selected group, the UE may determine the SSB/CSI-RS indices (e.g., RS ID reported in the group may be converted to actual SSB/CSI-RS index from the CSI Resource Configuration given in the candidate cell configuration).

When a list of indices of one or more parameters (e.g., SSB/CSI-RS indices, RA preamble indices, PRACH mask indices) is pre-configured, a codepoint in the DL message may be used to indicate the identifier of the tuple containing the selected set of indices of that parameter, in accordance with some embodiments. The number of bits of the codepoint for a parameter may depend on the total number of tuples configured for that parameter. The UE may derive the indices of the parameter by using the tuple identifier and the pre-configured list.

After receiving from a serving cell (e.g., a source DU) a downlink message including the parameters for mTRP TA acquisition for a target cell (e.g., target DU), the UE may initiate the TA acquisition procedure. From the given or derived SSB indices, given RA preamble indices, PRACH mask indices (e.g., in the case of CFRA), and the pre-configured RACH parameters (e.g., in the target DU configuration), the UE may determine (e.g., derive) the necessary parameters (e.g., PRACH preamble sequence, RACH occasion, preamble power, etc.) for each TRP. The source DU and/or CU may configure the UE with one (shared) or two independent timers for RA transmission, and the UE may also configure the UE with corresponding reception gap timers. The UE may transmit preambles to multiple TRPs (one preamble to each TRP) in the order of their RACH occasion locations. For example, the UE may first transmit the preamble to a TRP with first available RACH occasion, and then to a TRP with second available RACH occasion, and so on.

With respect to the Random Access Response, each TRP (for which a preamble is transmitted by the UE) may estimate the TA.

In some embodiments, the estimated TAs may be sent directly by the target DU to the UE. For example, each TA may be transmitted separately (e.g., as a random access response (RAR) message or a modified RAR message only containing the TA value) to the UE. After sending a preamble, the UE may be configured to wait for the TA reception before sending another preamble (associated with a different TRP). In some embodiments, the TA responses may be transmitted (e.g., separately) after the reception of last preamble transmitted by the UE. This may be configured when the target cell configures the TA acquisition parameters, and the UE may be configured accordingly (e.g., a RAR window may need to be adjusted accordingly). The order of TA responses may be same as the preamble receptions. Each TA response may indicate the absolute TA value, or the only first response may indicate the absolute TA and the remaining response may indicate the TA difference compared to the first absolute value. The UE may derive the receive (Rx) spatial domain filter (e.g., for the Rx beam) to receive a TA response for a TRP corresponding to the transmit (Tx) beam used to transmit the preamble towards that TRP.

In some embodiments, the TA values (associated with multiple TRPs) may be transmitted together in the same message (e.g., a modified RAR message) after the reception of last preamble transmitted by the UE. Multiple absolute TA values may be sent, or one absolute TA value and the remaining TA values as the TA difference compared to the first absolute value may be sent. The order of the TA values in the message may follow the order of preamble receptions by the TRPs (e.g., the TA value for the TRP which received the preamble first will placed first, and so on). The UE may be configured to receive a single message for all the preamble transmissions (e.g., RAR window may need to be adjusted accordingly). The UE may assume that the first TA in the message is associated with the first RS index (e.g., SSB/CSI-RS index) used for the PRACH transmission, second TA is associated with the second RS index, and so on. In another example, the network may provide TA values together with RA preamble or mask index or TCI-state index to indicate the association of TA command. The UE may also be indicated with the TRP (e.g., RS ID/SSB/CSI-RS ID) to be used for the RAR reception. The UE may use the indicated RS ID to derive the Rx spatial domain filter to receive the RAR message. This may be indicated as part of the DL message containing the TA acquisition parameters (e.g., PDCCH order). If only one TA value transmitted for example, the UE may assume the provided value is applicable for both TRPs.

In some embodiments, the estimated TAs (separately or together) may be sent by the target DU to the source DU. For example, the source DU may send the TAs (separately or together) as soon as the source DU receives the TAs from the target DU. This may be sent in a DCI (a new DCI may be used) or a MAC-CE to the UE. The order of separate messages or TA values in case of a single message may follow the order of preamble transmissions by the UE. The target DU may use the same order to enable the source cell to identify that. The different solution to indicate multiple TA values (absolute or difference) may also be applied here. In another example, the source DU sends the TA values later to the UE in the cell switch command. As described above, the order of TA values may for example follow the order of preamble transmissions by the UE. Moreover, when beam indication(s) is also sent in the cell switch command for example, the UE may assume the first TA is associated with the first beam indication (a TCI state or RS ID), the second TA is associated with the second beam indication, and so forth.

In some embodiments, the estimated TA value of one TRP may be sent directly to the UE, and the other TA(s) can be sent to the source-DU and/or CU.

In some embodiments, when the TAs associated with multiple TRPs are indicated together, each TA value may be associated with a CORESET Pool index (e.g., the associated CORESET pool index may also be sent along with the TA value indication).

In the examples noted herein, a TRP may not need to be referred explicitly. Instead, a TRP may be referred by a first TA value, second TA value, or n$^{th}$ TA value (and/or TA loop or TAG ID). In other words, instead of directly referring to a TRP, the UE may determine to associate first, second, and/or nth SSB index/RA preamble/PRACH mask index to a TRP via the association of SSB index/RA preamble/ PRACH mask index and TA value/TAG ID/TA loop ID.

When there is a RACH-less cell switch (e.g., DU switch), for the first uplink message after the cell switch (e.g., RRC Reconfiguration Complete message), the UE may be indicated with the TRP implicitly by using the associated TA index in the cell switch command which the source DU may receive from the target DU.

As the response to the received TA values, the UE may be configured to transmit a joint ACK/NACK or separate ones directly to the source DU or to at least one of the target TRPs.

Figure 2A:
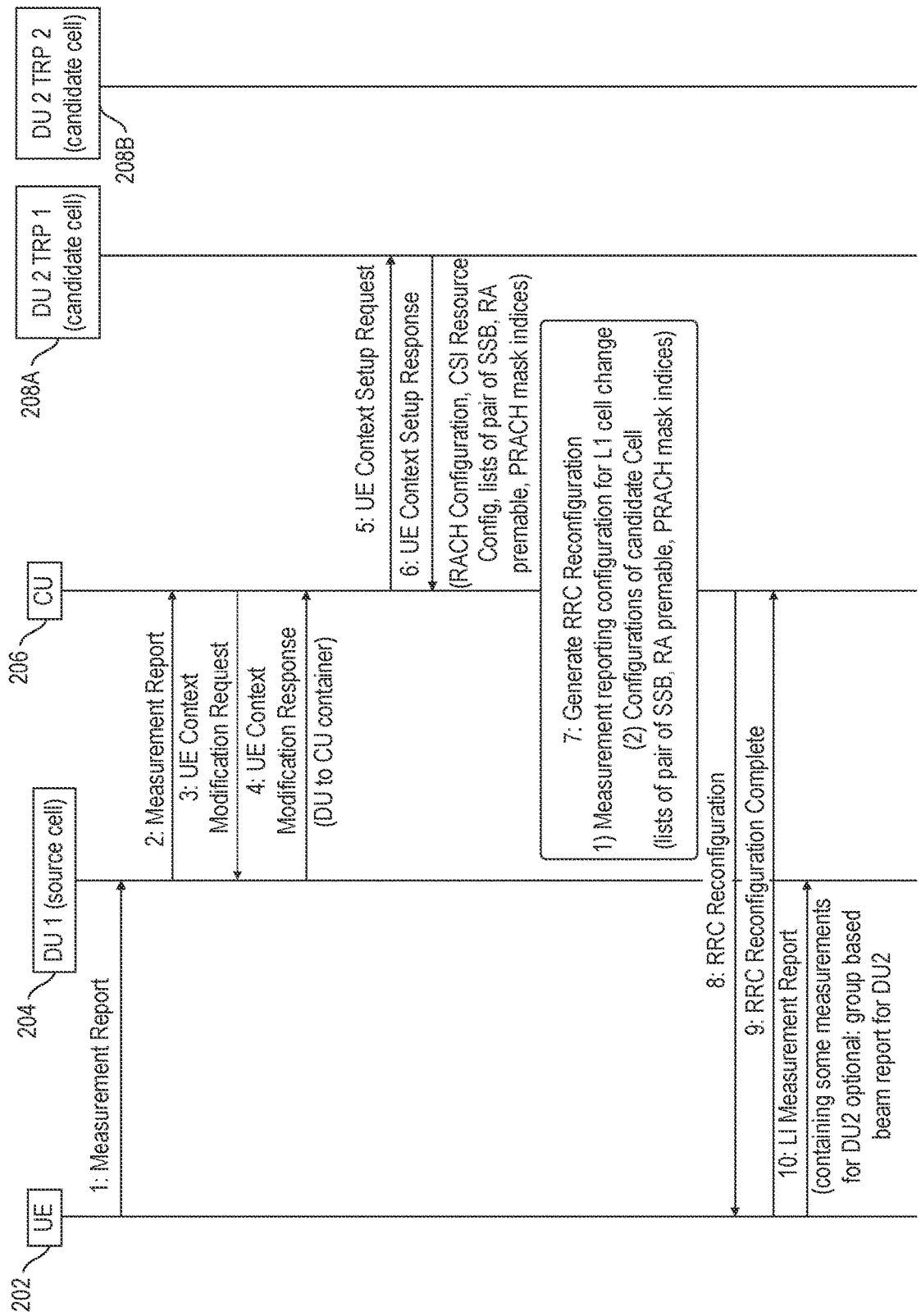
FIGS. 2A-2B depicts an example of a process for early timing advance (TA) acquisition for multiple transmit receive points (mTRP) operation in a target DU, in accordance with some embodiments.
Figure 2B:
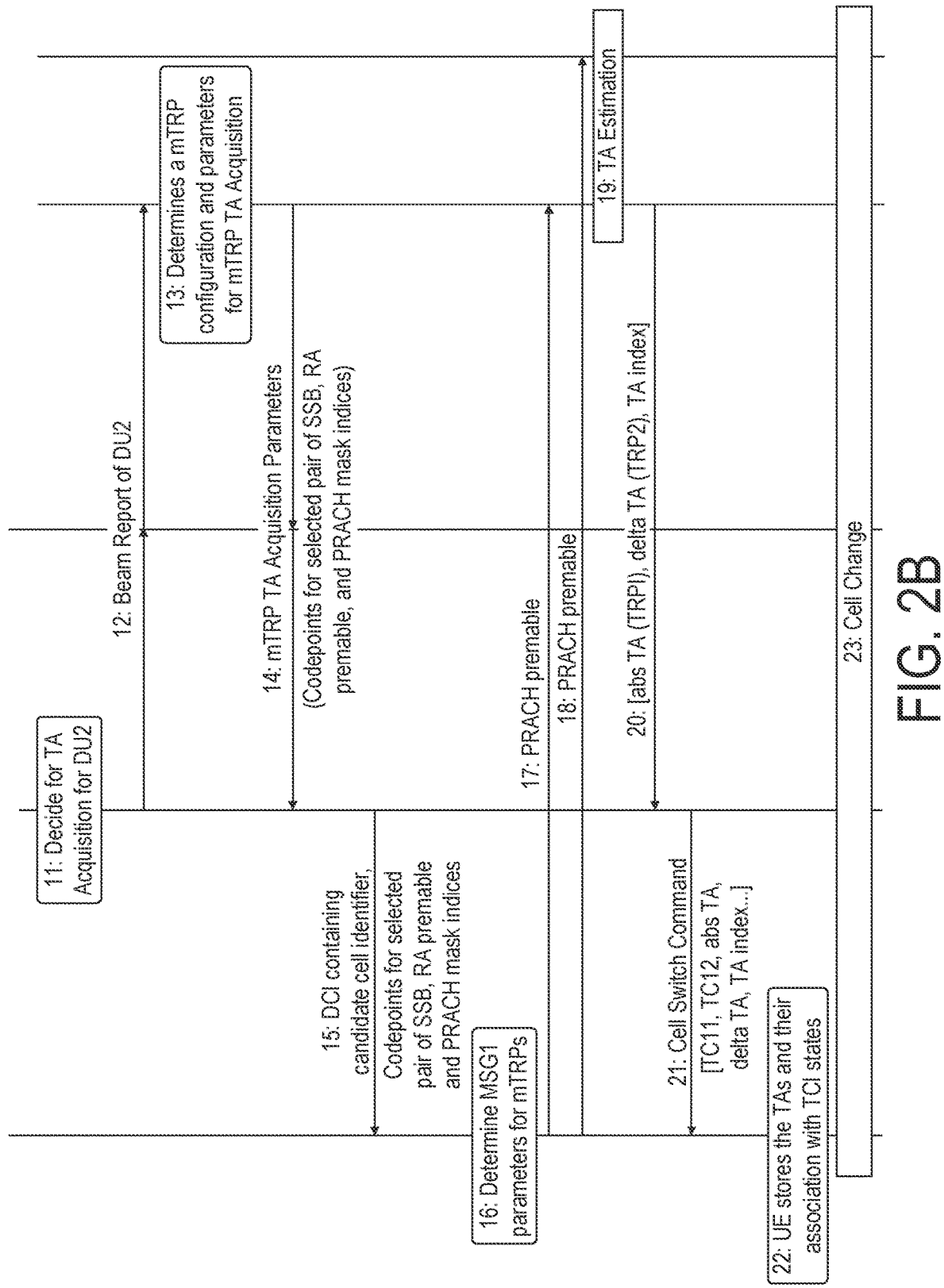

FIG. 2 depicts an example of a process for early TA acquisition for multiple transmit receive points (mTRP) operation in a target cell, such as a target DU, based on timing advance (TA) acquisition parameters selection. FIG. 2 depicts a UE 202, a source DU 204, a CU 206, and two target cells 208A-B (labeled DU 2) each with TRPs 208A- 208B. Although the example of FIG. 2 shows only one target cell (DU2) the process of FIG. 2 may be applied when multiple target cells are implemented and when the target cells are under the same DU or different DUs.

In the example of FIG. 2, the UE 202 is configured (or pre-configured) with for example three lists, which in the example of FIG. 2 are provided via 6-8, in accordance with some embodiments. The first list includes different pair Synchronization Signal Block (SSB) indices that are associated with the two TRPs at the DUs 208A-B. The second list includes different pair(s) of random access (RA) preamble indices that are associated with two TRPs. The third list includes different pair(s) of physical random access channel (PRACH) mask indices associated with the 2 TRPs. Specifically, the UE context setup response, at 6, sent from the DU 208A to the CU 206 includes the three lists. At 7, the CU generates a RRC reconfiguration message that is sent, at 8, to the UE 202. The RRC reconfiguration message includes measurement and reporting configuration and the configuration information of the target cell (or DU) to enable the early TA determination, wherein the configuration parameters include the lists of Synchronization Signal Block (SSB) indices that are associated with the two TRPs at the DUs 208A-B, pair(s) of random access (RA) preamble indices that are associated with two TRPs, and different pair(s) of physical random access channel (PRACH) mask indices associated with the 2 TRP. At 10, the UE sends measurement reports to the source DU 204 (which may include measurements for the target DU and/or group based beam reporting for the target DU). At 11, the source DU may a cell switch decision for the target DU. At 12, the source cell, such as source DU 204, forwards a beam report to DU 2 208A-B.

At 13, the DU 2 208A-B determines (e.g., selects) the mTRP configuration and the mTRP TA acquisition parameters (e.g., SSB indices, RA preamble indices, and PRACH mask indices), in accordance with some embodiments. At 14, based on the selected values of the mTRP TA acquisition parameters (and assuming a contention-free random access, CFRA), the DU 2 208A-B indicates an appropriate tuple indices from the corresponding pre-configured list of the parameters to the source DU 204. The tuple index for SSB configuration, RA preamble configuration, PRACH mask index configuration indicates a pair of SSB indices, a pair of RA preambles, a pair of PRACH mask indices, to be used for TA acquisition, respectively.

At 15, the source DU 204 sends a downlink control information (DCI) command to the UE 202 to acquire the TA for mTRP and the TA acquisition related parameters, in accordance with some embodiments. The DCI command may include the candidate cell identifier (e.g., target DU(s)), codepoints for the selected pair of SSB, RA preamble, and/or PRACH mask indices. The codepoints for each of the parameters may be the associated selected tuple indices. At 16, the UE uses the pre-configured lists received at 8, RACH configuration, and the TA acquisition parameters in the DCI to determine the preamble sequence, RACH occasions, and/or the like for both the TRPs at 208A-B, and the UE performs preamble transmissions at 17 and 18 to the DU 2 TRP 1 208A and DU 2 TRP 2 208B, respectively.

After the TA estimation at the DU 2 TRPs at 19, the DU 2 208A-B shares, at 20, with the source DU 204 the TAs (which are in the format of one absolute TA indication, and others as difference values) and the TRP (TA) index that the UE can use to attempt first after the cell switch. The TA index indicates which TA from the given list of TAs should be considered to access the target cell after the cell switch. For example, if there are two TAs associated with two TRPs are given, the TA index may be either 0 (indicating the first TRP) or 1 (indicating the second TRP). At 21, the source DU sends these within the cell switch command. After receiving the cell switch command, the UE stores, at 22, the value of the TAs and associates them with the transmission configuration index (TCI) states (e.g., the first TA is with first TCI state, the second TA is with second TCI state, and so forth). At 23 during the cell change, the UE attempts to access the indicated TRP, but in case of a failure, the UE would attempt another one of the TRPs for which the TA was also acquired by the UE.

Although FIG. 2 describes a way to provide the TA acquisition parameters and the estimated TAs, these may be provided in other ways as noted above and herein.

Figure 3A:
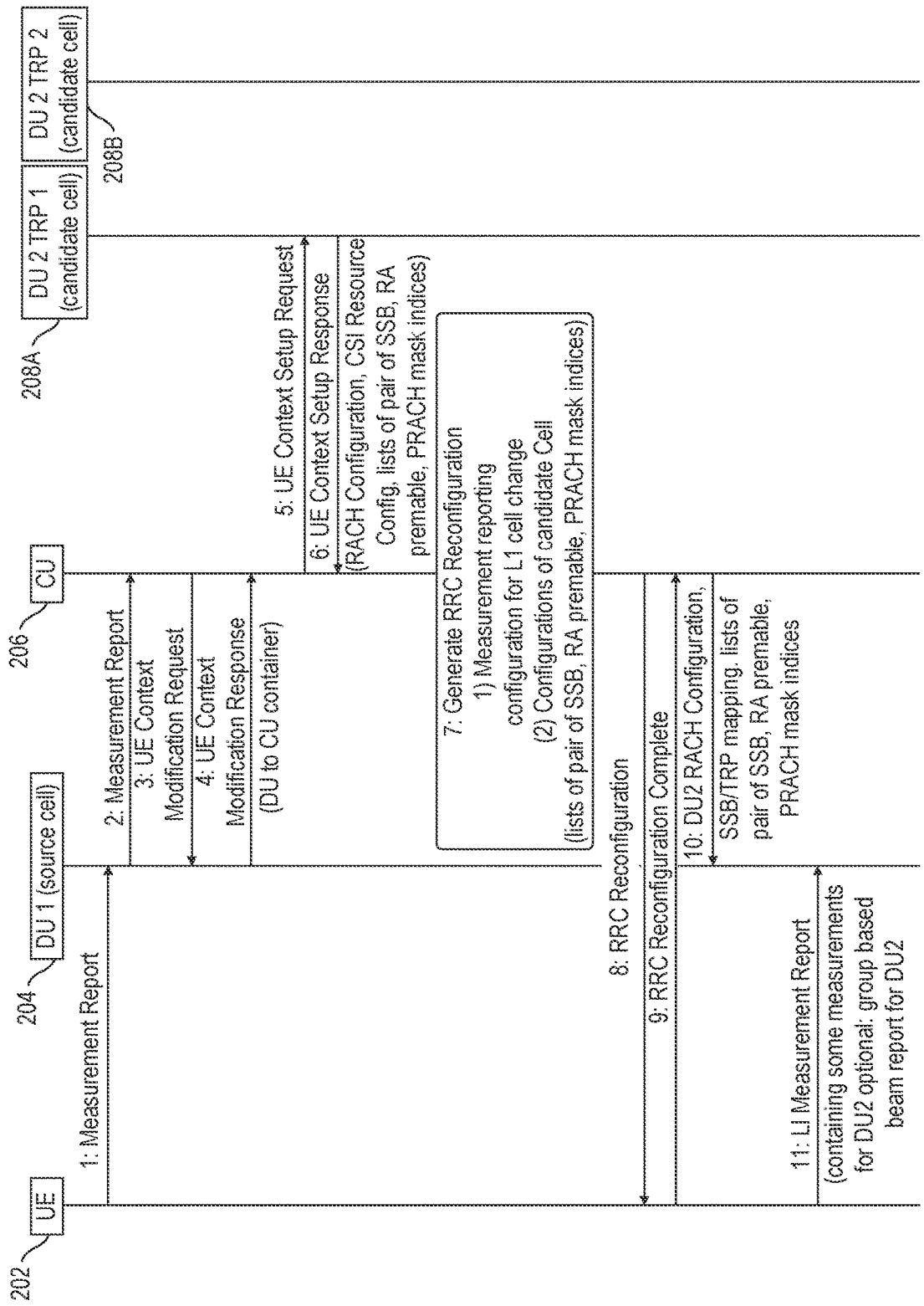
FIGS. 3A-3B depicts an example of a process for early TA acquisition for mTRP operation in a target distributed unit (DU), wherein the source DU selects the TA acquisition parameters, in accordance with some embodiments.
Figure 3B:
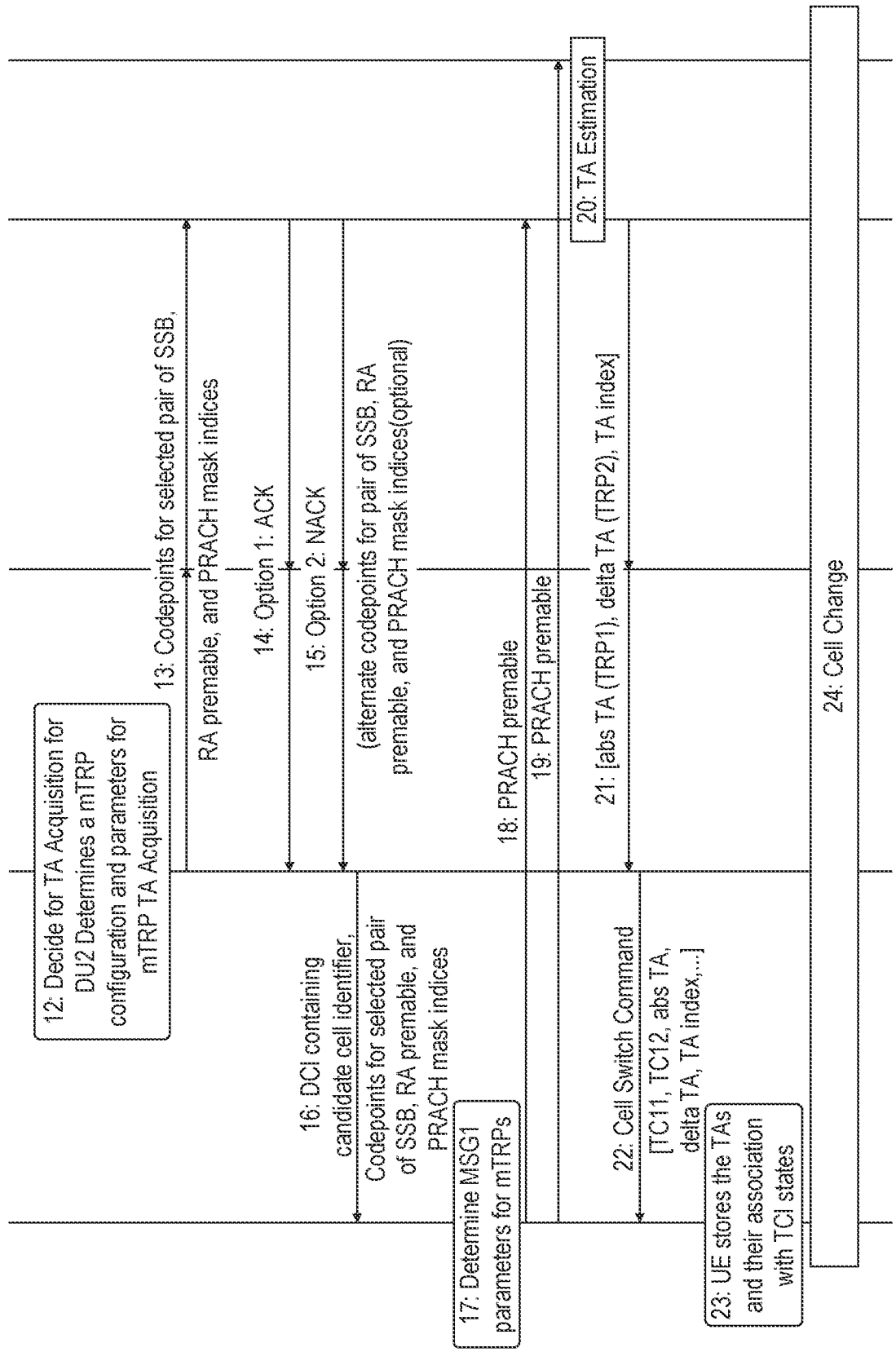

FIG. 3 depicts an example of a process for early TA acquisition for mTRP operation in a target cell, where the source DU (DU1) decides (or determines) the selection of the TA acquisition parameters, in accordance with some embodiments. Unlike the process of FIG. 2, the source DU 204 selects, at 12, the TA acquisition parameters. The source DU 204 determines (e.g., selects) the mTRP configuration and the mTRP TA acquisition parameters (e.g., SSB indices, RA preamble indices, and PRACH mask indices), in accordance with some embodiments. This may include selection of appropriate tuple indices from the corresponding pre-configured list of the parameters to the source DU 204 at step 10. The tuple index for SSB configuration, RA preamble configuration, PRACH mask index configuration indicates a pair of SSB indices, a pair of RA preambles, a pair of PRACH mask indices, to be used for TA acquisition, respectively. To enable this TA acquisition at the source DU, the DU 204 is provided, at 10, RACH configuration, association between SSBs and TRPs, pre-configured lists of SSB, RA preamble, PRACH mask indices and/or other TA acquisition parameters. After finalizing the TA acquisition parameters, the source DU 204 may then share, at 13, the TA acquisition parameters with the target DU 208A-B, which is confirmed at 14 and 15 before the source DU sends, at 16, the finalizing the TA acquisition parameters to the UE 202.

Figure 4A:
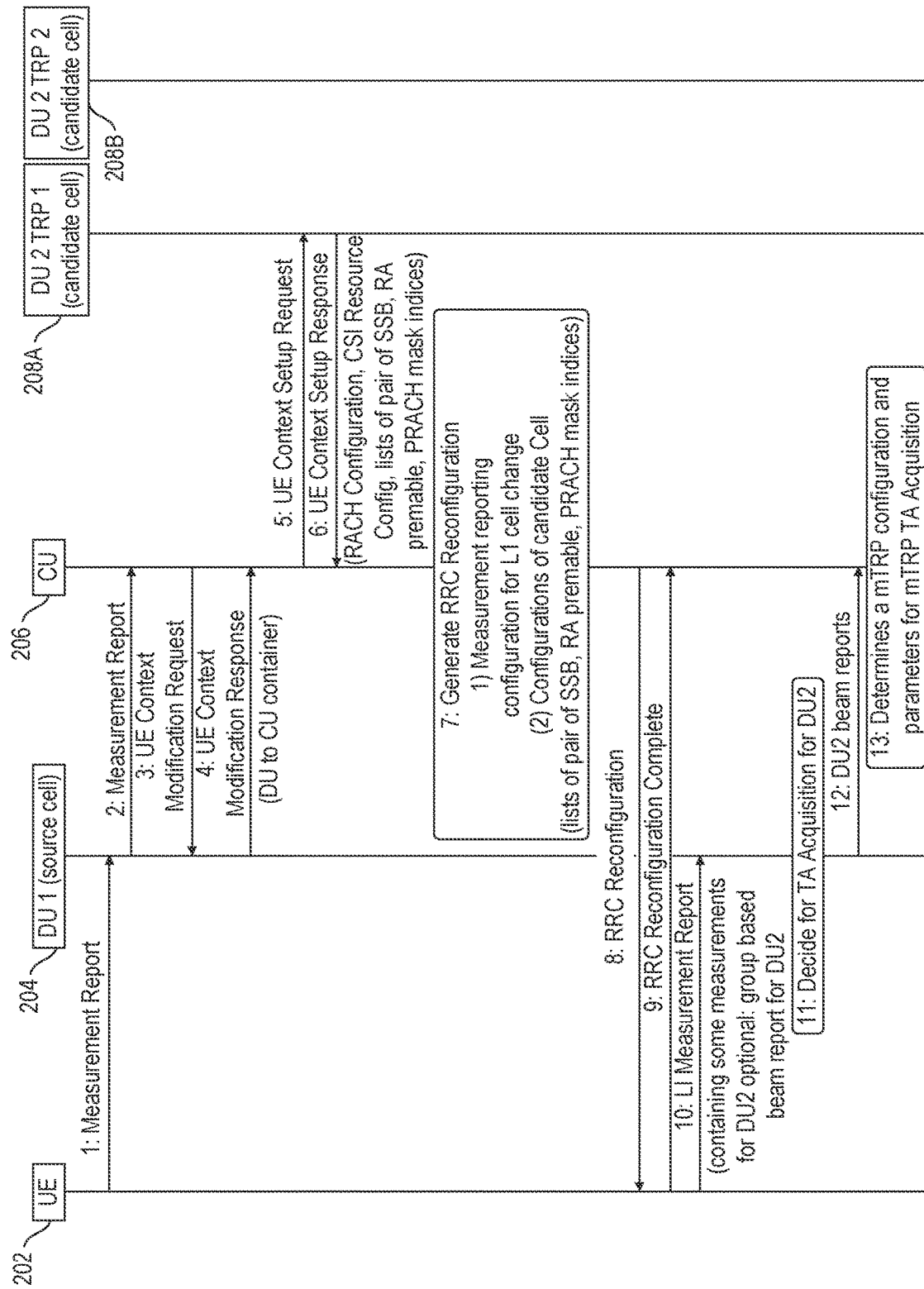
FIGS. 4A-4B depicts another example of a process for early TA acquisition for mTRP operation in a target DU, wherein a control unit determines the parameters for TA acquisition, in accordance with some embodiments.
Figure 4B:
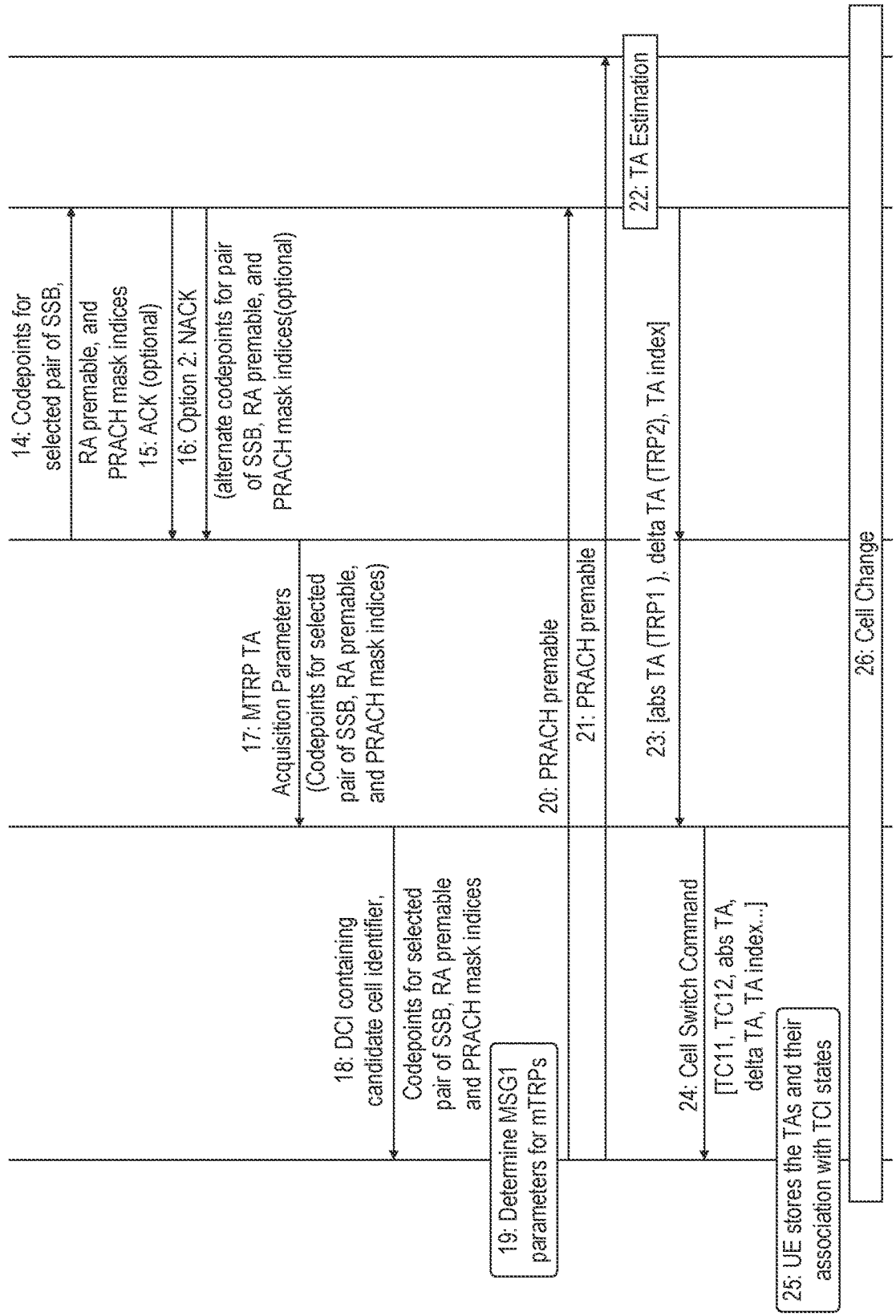

FIG. 4 depicts an example of a process for early TA acquisition for mTRP operation in a target cell, where the CU determines the parameters for TA acquisition, in accordance with some embodiments. At 13 for example, the CU 206 determines a mTRP configuration and as part of the determination selects the TA acquisition parameters for the mTRP. and forwards the selection to source DU (step 17). To enable the CU to determine the TA acquisition parameters, the source DU 204 shares, at 12, the beam reports of DU2 208A-B with the CU. After finalizing selection of the TA acquisition parameters at 13, the CU 206 shares, at 14, the TA acquisition parameters with the target DU 208A-B. In response, the CU 206 receives confirmation at 15 and/or 16 before the CU sending, at 17, the TA acquisition parameters the source DU 204.

Figure 5:
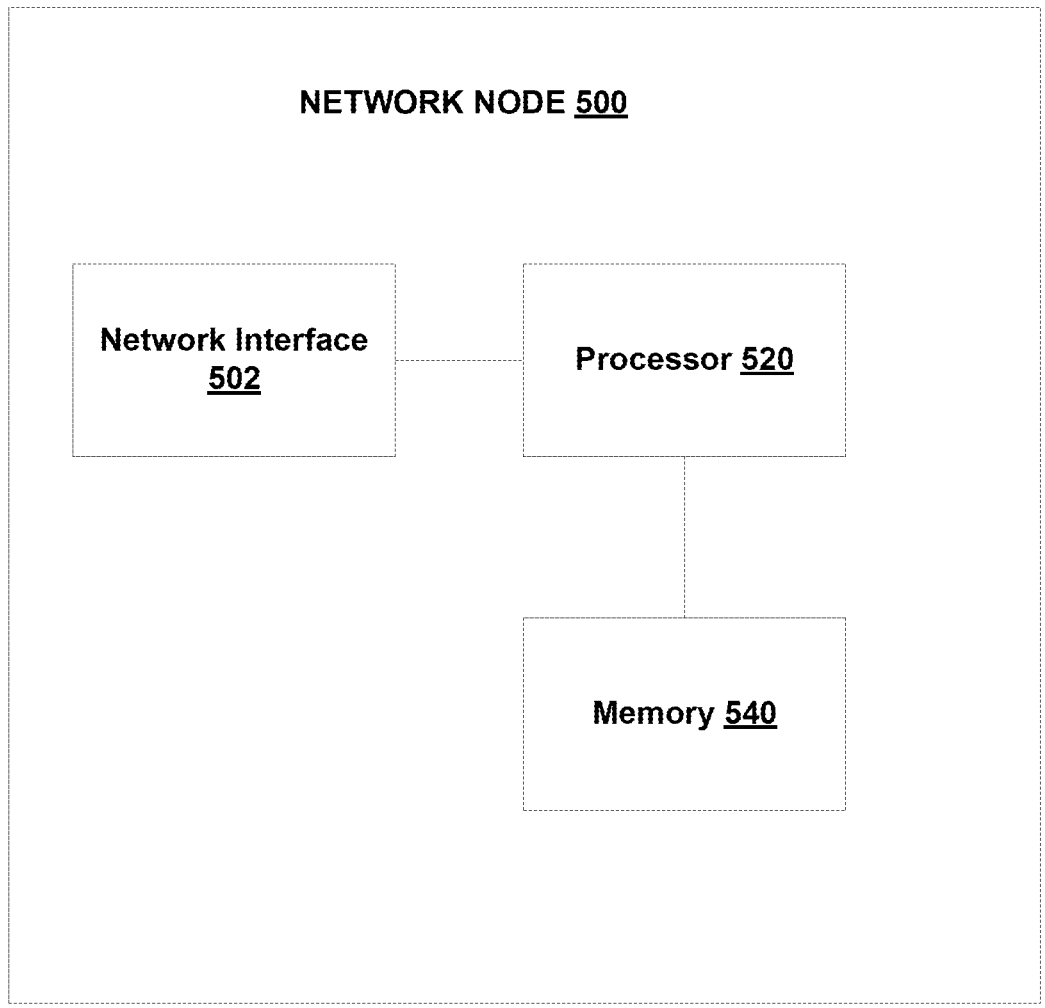
FIG. 5 depicts an example of a network node, in accordance with some example embodiments.

FIG. 5 depicts a block diagram of a network node 500, in accordance with some example embodiments. The network node 500 may comprise or be comprised in one or more network side nodes or functions (e.g., gNB, eNB, DU, TRPs, CUs, and/or the like).

The network node 500 may include a network interface 502, a processor 520, and a memory 504, in accordance with some example embodiments. The network interface 502 may include wired and/or wireless transceivers to enable access other nodes including base stations, other network nodes, the Internet, other networks, and/or other nodes. The memory 504 may comprise volatile and/or non-volatile memory including program code, which when executed by at least one processor 520 provides, among other things, the processes disclosed herein with respect to the trainer entity, verifier, and/or the like.

Figure 6:
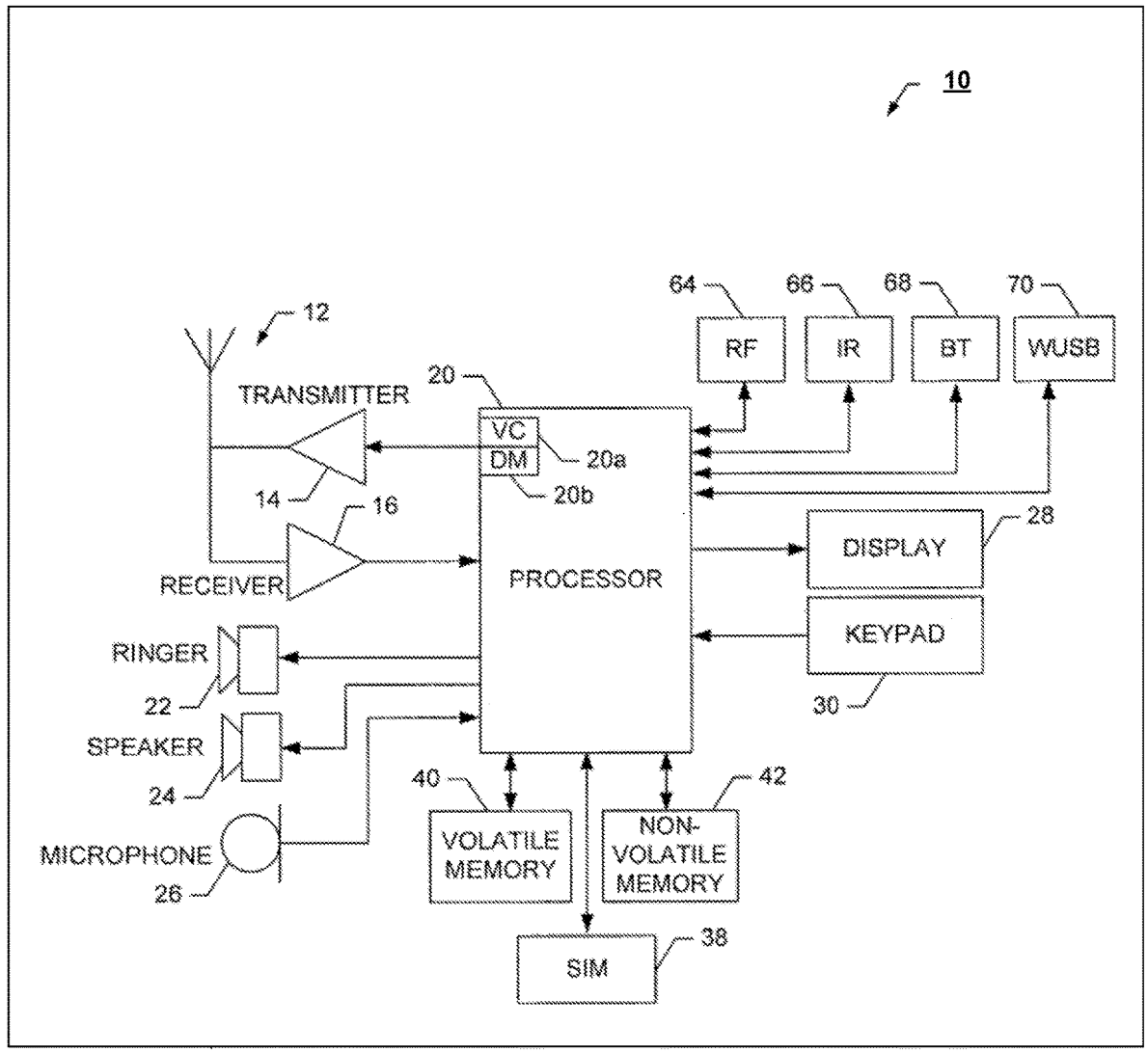
FIG. 6 depicts an example of an apparatus, in accordance with some example embodiments.

FIG. 6 illustrates a block diagram of an apparatus 10, in accordance with some example embodiments. The apparatus 10 may comprise or be comprised in a user equipment, such as user equipment (e.g., user entity, PRUs, etc.). In general, the various embodiments of the user equipment 204 can include cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions, in addition for vehicles such as autos and/or truck and aerial vehicles such as manned or unmanned aerial vehicle and as well as portable units or terminals that incorporate combinations of such functions. The user equipment may comprise or be comprised in an IoT device, an Industrial IoT (IIoT) device, and/or the like. In the case of an IoT device or ITOT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signalling via electrical leads to the transmitter and receiver. Likewise, processor 20 may be configured to control other elements of apparatus 10 by effecting control signalling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, sixth-generation (6G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE, such as the user entity.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry: computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may include reducing delays associated with cell switch to a target DU operating in mTRP.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor;
   at least one memory including program code which when executed by the at least one processor causes the apparatus to at least:
      receive timing advance acquisition parameters associated with multiple transmit receive points at a target distributed unit, wherein the timing advance acquisition parameters comprise, for the multiple transmit receive points, synchronization signal block indices, random access preamble indices, and physical random access channel mask indices;
      send downlink control information to a user equipment, the downlink control information comprising an identifier of the target distributed unit, codepoints for the synchronization signal block indices, the random access preamble indices, and the physical random access channel mask indices;
      receive timing advance estimates from the target distributed unit, wherein the timing advance estimates comprise estimates of timing advances associated with multiple transmit receive points at the target distributed unit; and
      send the timing advance estimates associated with the multiple transmit receive points at the target distributed unit, to the user equipment.

2. The apparatus of claim 1, wherein the codepoint for the synchronization signal block indices indicates a set of synchronization signal block indices associated with a set of transmit receive points at the target distributed unit, the codepoint for the random access preamble indices indicative of a set of random access (RA) preamble indices associated with the set of transmit receive points, and the codepoint for the physical random access channel mask indices indicates a set of physical random access channel mask indices associated with the set of transmit receive points, the codepoints being in accordance with a configuration provided to the user equipment as a part of the timing advance acquisition parameters.

3. The apparatus of claim 1, wherein the apparatus sends, to the user equipment in the cell switch command, the timing advance estimates associated with the multiple transmit receive points at the target distributed unit.

4. The apparatus of claim 1, wherein the timing advance estimates associated with the multiple transmit receive points comprise an indication of an absolute timing advance value for a transmit receive point and one or more indications of one or more differences of time advance values with respect to the absolute timing advance value, the one or more differences corresponding to the other transmit receive points.

5. The apparatus of claim 4, wherein each estimate of time advance is indicated with an associated CORESET Pool index.

6. The apparatus of claim 1, wherein the apparatus is further caused to:
receive a random access channel configuration for accessing the multiple transmit receive points at the target distributed unit;
select the timing advance acquisition parameters for the target distributed unit, the timing advance acquisition parameters comprising codepoints for the synchronization signal block indices, the random access preamble indices, and the physical random access channel mask indices;
share the selected timing advance acquisition parameters with the target distributed unit; and
in response to confirmation of the selected timing advance acquisition parameters by the target distributed unit, send the selected timing advance acquisition parameters to the user equipment.

7. The apparatus of claim 1, wherein the apparatus comprises or is comprised in a source distributed unit.

8. An apparatus comprising:
at least one processor;
at least one memory including program code which when executed by the at least one processor causes the apparatus to at least:
in response to receiving a beam report for the apparatus operating with multiple transmit receive points, select timing advance acquisition parameters for the apparatus, wherein the timing advance acquisition parameters include synchronization signal block indices, random access preamble indices, and physical random access channel mask indices;
share the selected timing advance acquisition parameters with a source distributed unit;
in response to one or more physical random access channel preambles from a user equipment, estimate timing advances for the multiple transmit receive points at the apparatus; and
share the estimated timing advances with the source distributed unit to enable a switch command including the estimated timing advances.

9. The apparatus of claim 8, wherein the apparatus is further caused to:
in response to receiving the beam report for the apparatus operating with multiple transmit receive points, select timing advance acquisition parameters for the apparatus, wherein the timing advance acquisition parameters include synchronization signal block indices, random access preamble indices, and physical random access channel mask indices, reference signal identifier or transmission configuration index state associated with a transmit receive point;
share the selected timing advance acquisition parameters with a source distributed unit;
in response to one or more physical random access channel preambles from a user equipment, estimate timing advances for the multiple transmit receive points at the apparatus; and
send the estimated timing advances associated with multiple transmit receive points to the user equipment, using the indicated transmit receive point.

10. The apparatus of claim 8, wherein the apparatus comprises or is comprised in a target distributed unit.

11. An apparatus comprising:
at least one processor;
at least one memory including program code which when executed by the at least one processor causes the apparatus to at least:
receive timing acquisition parameters associated with multiple transmit receive points at a target distributed unit, wherein the timing advance acquisition parameters comprise, for the multiple transmit receive points, codepoints for one or more sets of synchronization signal block indices associated with a set of transmit receive points, codepoints for one or more sets of random access preamble indices associated with the set of transmit receive points, and codepoints for one or more sets physical random access channel mask indices associated with the set of transmit receive points;
receive downlink control information from a source distributed unit, the downlink control information comprising an identifier of a target distributed unit, codepoints for synchronization signal block indices, random access preamble indices, and a physical random access channel mask indices;
in response to the downlink control information, determine first message parameters for random access of the multiple transmit receive points at the target distributed unit;
perform, using the determined first message parameters, preamble transmissions to the multiple transmit receive points at the target distributed unit to enable timing advance estimation; and
receive estimated timing advance for the multiple transmit receive points at the target distributed unit.

12. The apparatus of claim 11, wherein the apparatus, using codepoints in the downlink control information, determines the first message parameters for access of the multiple transmit receive points by at least deriving the synchronization signal block indices, random access preamble indices, physical random access channel mask indices from the received timing acquisition parameters.

13. The apparatus of claim 11, wherein the estimated timing advance associated with multiple transmit receive points at the target distributed unit are received in the cell switch command from the source distributed unit and/or from the target distributed unit.

14. The apparatus of claim 13, wherein a reference signal identifier or transmission configuration index state identifier to be used to receive the timing advance associated with multiple transmit receive points from the target distributed unit are provided to the apparatus in the downlink control information from the source distributed unit.

15. The apparatus of claim 11, wherein the apparatus is further caused to determine that an order of indicators of the received timing advance parameters, which are associated with multiple transmit receive points, are in a same order of transmission of the first message of random access.

16. The apparatus of claim 11, wherein the apparatus is further caused to determine that indicators of the received timing advance values are associated with the multiple transmit receive points beam indications, wherein at least a first timing advance indicator is associated with the first beam indication, and a second timing advance indicator is associated with the second beam indication.

17. The apparatus of claim 11, wherein the apparatus comprises or is comprised in a user equipment.

18. An apparatus comprising:
   at least one processor;
   at least one memory including program code which when executed by the at least one processor causes the apparatus to at least:
      receive a context setup for a user equipment, wherein the context setup comprises timing advance acquisition parameters associated with multiple transmit receive points at a target distributed unit, wherein the timing advance acquisition parameters comprise, for the multiple transmit receive points, synchronization signal block indices, random access preamble indices, and physical random access channel mask indices;
      generate a radio resource control reconfiguration message comprising the timing advance acquisition parameters associated with multiple transmit receive points at the target distributed unit, wherein the timing advance acquisition parameters comprise, for the multiple transmit receive points, synchronization signal block indices, random access preamble indices, and physical random access channel mask indices;
      send the radio resource control reconfiguration message towards the user equipment;
      in response to receiving a beam report that is sent after a decision to switch to the target distribution unit, select the timing advance acquisition parameters for the target distributed unit, wherein the selected timing advance acquisition parameters comprise codepoints for the synchronization signal block indices, the random access preamble indices, and the physical random access channel mask indices;
      share the selected timing advance acquisition parameters with the target distributed unit; and
      in response to confirmation of the selected timing advance acquisition parameters by the target distributed unit, send the selected timing advance acquisition parameters to the user equipment via a source distributed unit to enable a timing advance acquisition for the target distribution unit with multiple transmit and receive points operation.

19. The apparatus of claim 18, wherein the apparatus comprises or is comprised in a control unit.

* * * * *